United States Patent
Bonutti

(10) Patent No.: US 6,824,108 B2
(45) Date of Patent: Nov. 30, 2004

(54) ACTIVE DRAG MODULATION SYSTEM AND METHOD

(75) Inventor: Peter M. Bonutti, Effingham, IL (US)

(73) Assignee: The Bonutti 2003 Trust-A, Effingham, IL (US)

( * ) Notice: Subject to any disclaimer, the term of this patent is extended or adjusted under 35 U.S.C. 154(b) by 0 days.

(21) Appl. No.: 10/287,379

(22) Filed: Nov. 4, 2002

(65) Prior Publication Data

US 2004/0084568 A1 May 6, 2004

(51) Int. Cl.[7] .................................................. B64C 27/00
(52) U.S. Cl. ..................... 244/201; 244/204; 244/75 R; 244/130
(58) Field of Search ................................. 244/201–205, 244/75 R, 130; 114/67 R

(56) References Cited

U.S. PATENT DOCUMENTS

| | | | |
|---|---|---|---|
| 2,077,071 A | | 4/1937 | Rose |
| 3,455,266 A | | 7/1969 | Giles |
| 4,363,991 A | * | 12/1982 | Edelman .................. 73/861.72 |
| 4,741,498 A | * | 5/1988 | Gerhardt ..................... 244/130 |
| 4,932,610 A | * | 6/1990 | Maestrello .................. 244/203 |
| 5,365,490 A | * | 11/1994 | Katz .......................... 244/204 |
| 5,797,563 A | * | 8/1998 | Blackburn et al. .......... 244/130 |
| 6,570,333 B1 | | 5/2003 | Miller |
| 2003/0187123 A1 | | 10/2003 | Labude |

* cited by examiner

*Primary Examiner*—Galen Barefoot
(74) *Attorney, Agent, or Firm*—Fleit Kain Gibbons Gutman Bongini & Bianco; Paul D. Bianco; Martin Fleit

(57) ABSTRACT

A vehicle traveling through an environmental media such as air experiences drag. The drag is actively modulated by energy beams which may either increase or decrease the drag. The energy beams may be ultrasonic and provide acoustic energy at a transition region between turbulent and laminar flows or at the leading edge of a laminar flow in order to facilitate the respective increase or decrease in drag. The ultrasonic beams may be placed at various locations of an aircraft in order to provide some flight control. The ultrasonic beams may be placed on an automobile to facilitate desired operating modes of the vehicle. The ultrasonic beams may be a further component of a parametric array for communicating audio signals ahead and behind the vehicle in addition to drag modulation.

26 Claims, 4 Drawing Sheets

ACTIVE DRAG MODULATION SYSTEM AND METHOD

FIELD OF THE INVENTION

This invention relates to the field of vehicles experiencing drag traveling through an environmental media, the modification thereof and vehicle alert generation.

BACKGROUND OF THE INVENTION

Supercavitation occurs when an object moving through water reaches speeds in excess of 100 knots. At this speed it is possible for a bubble of air to form around the object, beginning at the nose of the object. The bubble can extend completely around the entire object and hence the object is no longer moving through the water, rather the object is moving through air. This results in a significantly reduced amount of friction or drag. Hence, supercavitation allows a craft to travel at a high speed on or below the surface of the water with a significant reduction in drag.

When a supersonic airflow passes over a wedge, a shock wave forms at the point of the wedge. This kind of shock wave is called an oblique shock because it forms at some non-orthogonal angle to the surface of wedge (a shock wave perpendicular to the surface is known as a normal shock). As the Mach number increases, the shock angle becomes smaller. Therefore, the distance between the wedge surface and the shock decreases with increasing speed. For a hypersonic body, this distance can become very small over a large portion of the body, and the resulting flow field between the surface and shock is often referred to as a shock layer. The shock layer may merge with the boundary layer at low Reynolds numbers to form a fully viscous shock layer. At high Reynolds numbers, the shock layer can be treated as inviscid (meaning there is no friction). In the limit as Mach number goes to infinity, the shock layer forms an infinitely thin, infinitely dense sheet, or, essentially, a flat plate. The infinite flat plate is the most efficient lifting surface at hypersonic velocities.

Because air is viscous at sub-sonic speeds, any object moving through it collects a group of air particles which it pulls along with it. A particle directly adjacent to the surface of the object will be pulled along at approximately the speed of the object due to viscous adhesion. As an airfoil moves through a free stream of air at a given velocity, this effect causes a very thin layer of air having velocities below that of the free stream velocity, to form upon the airfoil surface. This layer, known as the "boundary layer", constitutes the interface between the airfoil and its surrounding air mass. Conceptually, the boundary layer may be thought of as the layer of air surrounding an airfoil in which the velocity of the layer of molecules closest to the airfoil is at or near zero with respect to the airfoil, and in which the velocity at successively distant points from the airfoil increases until it approaches that of the free stream, at which point the outer limit of the boundary layer is reached. Generally, boundary layers may be thought of as being one of two types, laminar or turbulent, although there is a region of transition between laminar and turbulent that may, in some cases, be quite large. See FIG. 1 and U.S. Pat. No. 4,802,642 to Mangiarotty which is hereby incorporated by reference. A third condition, in which the boundary layer is "unattached", must also be recognized. A laminar boundary layer is typified by smooth flow that is free from eddies. Conversely, turbulent flow is characterized by a thicker boundary layer that has a large number of eddies that act to transfer momentum from the faster moving outer portions to the relatively slower portions nearer the airfoil surface. Consequently, a turbulent boundary layer has a greater average velocity near the airfoil surface, and a correspondingly greater amount of surface friction, than does a laminar boundary layer. The increase in surface friction causes increased aerodynamic drag that requires greater power consumption to maintain constant airfoil speed.

Typically, a laminar boundary layer will form at or near the leading edge of a conventional airfoil and extend rearward toward the points of minimum pressure on the upper and lower surfaces. According to Bernoulli's principle, the region between the leading edge and the first minimum pressure point is one of a decreasing pressure gradient. Thereafter, the pressure gradient will increase and the relatively low kinetic energy of the air molecules closest to the airfoil surface may be insufficient to maintain laminar flow against the gradient. In this event it is possible that small perturbations in the boundary layer will develop into eddies that initiate a transition from laminar to turbulent flow. Alternatively, in the presence of higher pressure gradients, the molecules closest to the airfoil surface may actually reverse their direction of motion and begin to move upstream, thereby causing the boundary layer to separate from the airfoil surface. This condition causes significantly more drag, and less lift, than a turbulent boundary layer, and reattachment will not normally occur unless some means is employed to reenergize the boundary layer. The problem, then, is to develop means to control the boundary layer of an airfoil in order to reduce aerodynamic drag and the energy losses associated therewith.

Prevention of the transition from laminar flow to turbulent flow in aerodynamic boundary layers on the surfaces of vehicles is an important method for reducing aerodynamic drag, and hence reducing energy consumption. The invention herein utilizes acoustic energy to increase the incidence of laminar flow. The use of acoustical methods for total or local control of laminar flow is potentially more economical in energy consumption, and also involves simpler and lighter installations than are required for other systems.

In other instances it is desirable to increase drag, for example during vehicle braking. While some aircraft have movable control surfaces that increase drag and lift, movable control surfaces on other vehicles such as automobiles or boats become impractical. Movable control surfaces add considerable weight, cost and complexity to the design of a vehicle, which may nevertheless benefit from increases in drag in certain applications. Aerodynamic drag may be increased by disrupting laminar flows with acoustic energy. Selective radiation of acoustic energy creates a turbulent flow event on a leading aerodynamic edge where an otherwise low drag laminar flow would be present. This disruption of laminar flow with acoustic energy thereby increases vehicle drag. Thus, what is needed is a drag modulation system that uses acoustic energy to increase or decrease an amount of vehicle drag in response to various usages of the vehicle.

A more recent technology involving directional sound has developed as part of an attempt to reproduce sound without use of a moving diaphragm such as is applied in conventional speakers. This sound propagation approach includes technologies embodied in parametric speakers, acoustic heterodyning, beat frequency interference and other forms of modulation of multiple frequencies to generate a new frequency.

In theory, sound is developed by the interaction in air (as a nonlinear medium) of a modulated ultrasonic frequency whose modulation component in value falls within the audio range. The nonlinear characteristics of air under these conditions results in a mixing of the ultrasonically modulated signal at a physical point of contact. The mixing result is the demodulated audio component of the signal. Ideally, resulting compression waves would be projected within the air as a nonlinear medium, and would be heard as pure sound. An interesting property of parametric sound generation is enhanced directionality afforded by the highly directional ultrasonic carrier.

Ultrasonic acoustic energy may be the acoustic energy used to increase and decrease vehicle drag. Ultrasonic energy has the advantage in that the acoustic energy is beyond the hearing range of most individuals, and is thus a quiet mode of drag control. Ultrasonic transducers are tuned to operate efficiently in a relatively narrow frequency range and are typically precluded from being effective at generating frequencies low enough to be heard as audio signals. Since in many applications, it is desirable for a vehicle to emit an audio alert, such as a horn or other warning sound, what is needed is a method and device for both silently modulating the drag of a vehicle and for generating an audio alert when appropriate.

SUMMARY OF THE INVENTION

In accordance with the present invention, a vehicle travels in a forward direction though an environmental media and experiences vehicle drag as a result thereof. A method comprises the step of modifying the vehicle drag by transmitting an energy beam from the vehicle into the environmental media in the forward direction.

In accordance with the present invention, a vehicle travels through an environmental media and experiences drag as a result of the environmental media. A vehicle device comprises a first energy beam transmitter for transmitting a first energy beam for decreasing the drag, a second energy beam transmitter for transmitting a second energy beam for increasing the drag, and an active drag controller for selectively enabling said first and second energy beams.

In accordance with the present invention, a method comprises the steps of transmitting an ultrasonic signal from a moving vehicle, and selectively modulating the ultrasonic signal with an audio signal.

In accordance with the present invention, a vehicle device comprises a forward facing ultrasonic transmitter for transmitting a forward ultrasonic beam in a forward direction, a rearward facing ultrasonic transmitter for transmitting a rearward ultrasonic beam in a rearward direction, an audio modulator for selectively modulating an audio signal on the forward and rearward ultrasonic beams and a user input receiver coupled to said audio modulator for modulating the audio signal on the forward ultrasonic beam in response to a first user input and for modulating the audio signal on the rearward ultrasonic beam in response to a second user input.

DETAILED DESCRIPTION OF THE INVENTION

Figure 1:
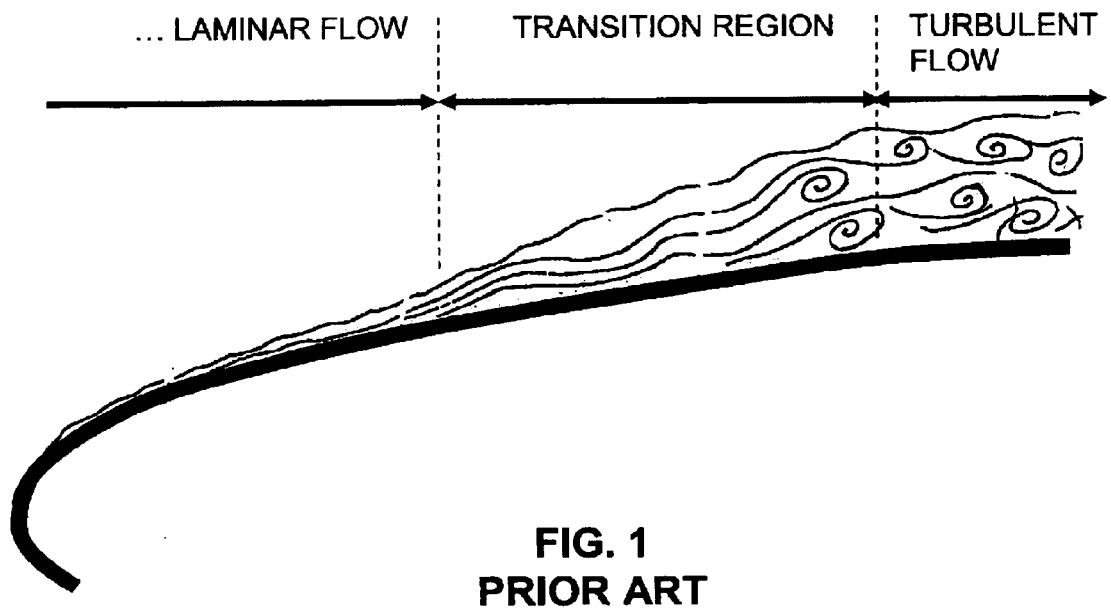
FIG. 1 shows a prior art airfoil section showing laminar flow, transition and turbulent boundary layers.

FIG. 1 illustrates a typical lifting aerodynamic surface having a laminar flow boundary layer. Thin laminar boundary layer flow is observed in the laminar flow region from the leading edge to a point at which transition begins. The beginning of the transition region is characterized by a thickening of the boundary layer and the appearance of small eddying perturbations in airstream velocity. As the airstream progresses through the transition region, certain airflow disturbances within a range of predictable oscillatory frequencies, known as Tollmien-Schlichting waves, become amplified to form eddies that cause a transfer of momentum from the higher energy air near the outer surface of the boundary layer to the low energy air at the surface. At this point the airstream enters the turbulent region, being comprised of many large eddies and characterized by a relatively higher average velocity near the airfoil surface. The higher velocity creates greater surface friction with the airfoil which is evidenced as an increase in aerodynamic drag.

Mathematical analyses done by W. Tollmien in the early 1930s resulted in the publication of a theory of the stability of laminar motion in the boundary layer near a thin flat plate in an airstream flowing parallel to the plate. The calculations were repeated and extended by H. Schlichting in 1933 and 1935, and were confirmed experimentally in 1941 by Schubauer and Skramstad. The theory predicted that a range of small disturbances or perturbations in the velocity of a laminar airstream would, in mathematically identifiable regions, take on an oscillatory motion, or mode, that would become amplified until laminar flow was broken down. Disturbances occurring outside such identifiable regions would become damped. The regions in which amplification occurred were defined as a function of Blasius velocity distribution and Reynolds number, and experimental data conformed closely to the mathematically predicted phenomena. Schubauer and Skramstad's experimental data also confirmed that the frequency of the amplified oscillations, known as Tollmien-Schlichting, or T-S, waves, fell within a relatively narrow frequency bandwidth.

In experiments conducted jointly by The Boeing Company and the National Aeronautics and Space Administration in late 1985, T-S mode frequencies were calculated for the wing boundary layers for a Boeing 757-200 commercial transport. These predicted T-S frequencies were then confirmed experimentally from flight test data measured with hot film sensors on the surfaces of the airplane wing. The predicted and experimentally verified T-S frequencies were in the range of 100 to 6000 Hz, varying as predicted with wing location, flight altitude, and speed.

Other research has confirmed that Tollmien-Schlichting waves are responsive to external acoustical excitation. The application of acoustic energy having frequencies within the range of the characteristic critical wavelengths of TS waves has been shown to enhance the amplification of T-S waves. It has also been found that external acoustic excitation of a laminar boundary layer within a frequency band slightly wider than the T-S waves in the laminar flow to be controlled causes a delay in the amplification process of T-S waves. This occurs when the wavelengths of the acoustic disturbances are in the same range as the T-S wavelengths and interact with the T-S waves in a time-phase relationship to delay amplification of disturbances in the laminar flow.

A third regime in which T-S waves are affected by external acoustic excitation is found at frequencies substantially higher than the T-S wave critical frequencies, that is, at wavelengths substantially shorter than the T-S critical wavelengths. In this case, acoustic disturbances impinging on the laminar flow interfere destructively with the growing T-S waves. Acousting excitation sufficient to destructively interfere with T-S waves must contain frequencies at least twice as high as the highest of the T-S critical frequencies. It is within this third regime that the invention herein finds an exemplary embodiment.

Figure 2:
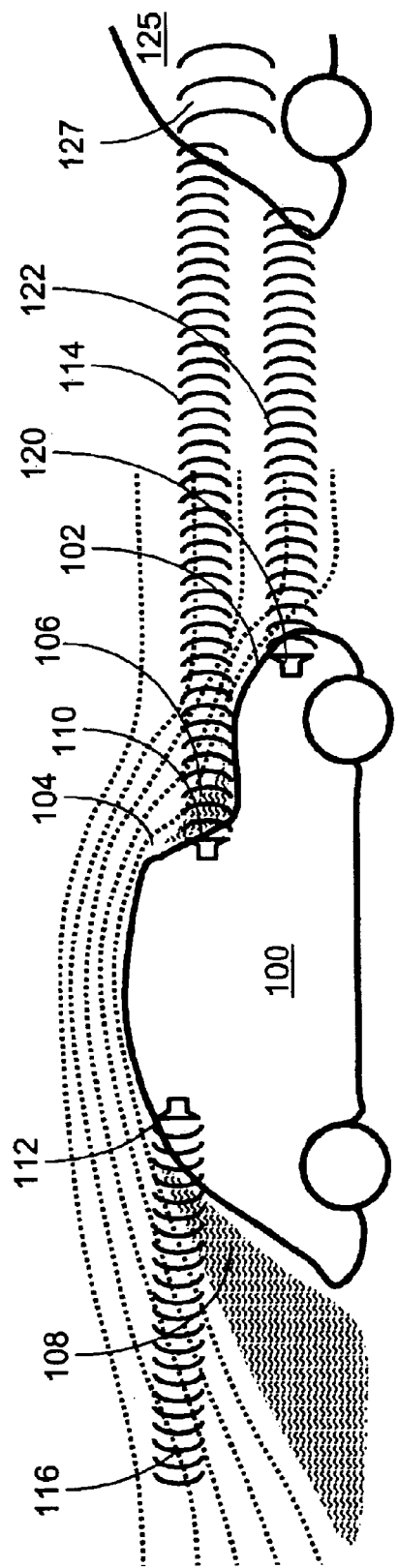
FIG. 2 shows a vehicle with ultrasonic active drag modulation and acoustic alerts in accordance with the present invention.

FIG. 2 shows a vehicle with ultrasonic active drag modulation and acoustic alerts according to the present invention. Vehicle 100 has laminar flow regions on its leading edge bumper 102 and roof 104 and turbulent regions above the hood 106 and aft 108. Ultrasonic radiators 110 and 112 radiate ultrasonic energy beams 114 and 116 respectively into the transition areas between laminar flow 102 and turbulence 106 and laminar flow 104 and turbulence 108. As previously described the ultrasonic energy beams 114 and 116 provide an acoustic disturbance that decreases drag. Transducer 120 produces an ultrasonic energy beam 122 in the laminar flow region 102, preferably at the leading edge or bumper of the vehicle 100. Ultrasonic energy beam 122 disrupts the laminar flow and increases drag when activated.

Vehicle 100 can be an automobile having no active fins or wings or other moving components to modify the drag of the vehicle. Nevertheless, the drag of vehicle 100 can be actively modulated relative to the static drag produced by the body the vehicle. The drag of the vehicle is reduced by energy beams 114 and 116 and the drag of the vehicle is increased by energy beam 120. Thus, a control system such as the control system of FIG. 4 may be used to actively modulate the drag of the vehicle by selectively transmitting energy beams 114, 116 and 122.

The ultrasonic energy beams have the further advantage of providing the modulation of drag without moving control surfaces and while maintaining a quiet environment. The quiet environment is the result of the high frequency ultrasonic energy beam being beyond the hearing range of vehicle occupants and pedestrians. However, there are instances during the operation of the vehicle where it is desirable to provide audio alerts to other vehicles ahead or behind. This alert is typically provided by a horn generating a substantially omni directional audio warning. However, often times the warning is intended only for those in front or behind the vehicle. For example, if a vehicle ahead remains stopped at a green light then a forward alert would be appropriate. Similarly, a vehicle behind should be cautioned of a sudden application of the brakes by a rearward warning. Ultrasonic energy beams 114, 116 and 118 have the further advantage of operating as a parametric array and are capable of precisely generating audio alerts in areas ahead and behind the vehicle due to the directional nature of the ultrasonic energy beam.

FIG. 2 also shows that forward facing ultrasonic energy beams 114 and/or 122 are further modulated with an audio signal. When these ultrasonic energy beams reach the vehicle 125 located ahead of vehicle 100, an audio signal 127 is generated, sounding as if the audio signal originates in the area of contact of energy beams 114 and/or 122 with vehicle 125. Since the ultrasonic beams are highly directional, this provides for highly directional and potentially individualized communications from vehicle 100 to vehicle 125. Furthermore, since the rear of most vehicles such as vehicle 125 include a significant complement of glass which is substantially acoustically transmissive, and since the audio component of the alert could sound as if it is originating at the glass, the operator inside of vehicle 125 will likely be able to clearly hear the alert even if exterior noise elimination approaches are taken in the design of the vehicle to quiet the interior of the vehicle. The occupants of vehicle 125 will hear the alert as if it were originating at the rear glass of vehicle 125. Furthermore, vehicles adjacent to vehicle 125 will likely not hear or hear a substantially quieter alert signal because of the directionality of the ultrasonic energy beams 114 and 122 and the natural attenuation characteristics of audio. Similarly, energy beam 126 may be used to communicate alert signals to a vehicle behind vehicle 100.

Figure 3:
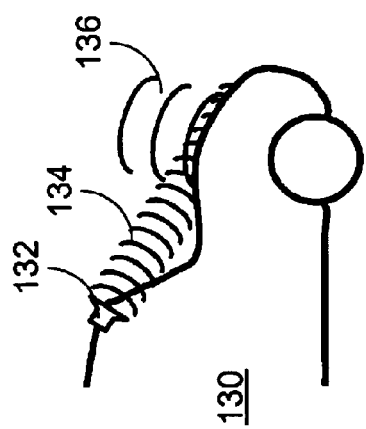
FIG. 3 shows an alternate embodiment of a vehicle with ultrasonic active drag modulation in accordance with the present invention.

FIG. 3 shows an alternate embodiment of a vehicle with ultrasonic active drag modulation. In FIG. 3 vehicle 130 has a transducer 132 situated such that an ultrasonic beam strikes an area of the vehicle where the airflow is transitioning from laminar to turbulent. In this embodiment, acoustic energy 136 occurs at the transition area even though there is no transducer located at the transition area. Acoustic energy represents the mixing products resulting from a modulated signal transmitted by the parametric array, or the acoustic energy generated by the transducer and reflected by the vehicle body. Note the modulated signal may have either audio or ultrasonic frequency component. This alternate embodiment has the advantage of allowing for the occurrence of acoustic energy at the transition region without locating a transducer at the transition region.

Figure 4:
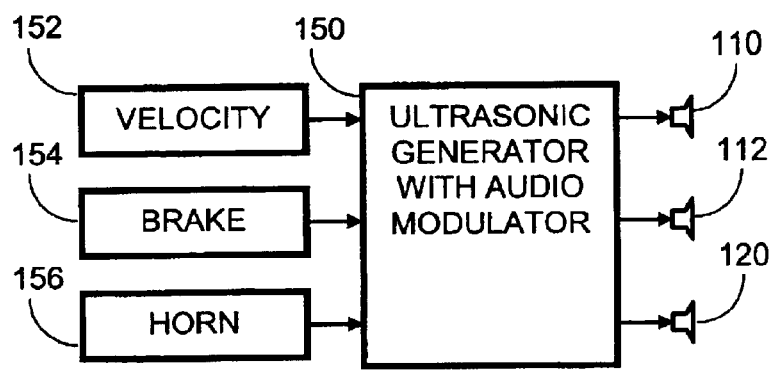
FIG. 4 shows a block diagram of the ultrasonic active drag modulation system with acoustic alerts in accordance with the present invention.

FIG. 4 shows a block diagram of the ultrasonic active drag modulation system with acoustic alerts. Acoustic transducers 110, 112 and 120 are driven by ultrasonic generator and audio modulator 150. While three transducers are shown, the invention is not limited to three transducers. Any number of transducers are may be used in any number of various vehicle locations in realizing the purposes of the invention. Each of the transducers, although shown as a single device, may be an array of transducers or other arrangement known to those familiar with the art that result in the transmission of ultrasonic or other form of acoustic energy.

The ultrasonic generator includes amplifiers for driving the corresponding transducers with an ultrasonic signal. The ultrasonic generator further includes an ultrasonic carrier signal for setting the frequency of the ultrasonic beam transmitted by the transducers. The ultrasonic generator also includes an audio modulator for modulating the ultrasonic carrier signal. Preferably the ultrasonic carrier signal is amplitude modulated with the audio signal. For example, the ultrasonic signal could be set at 50 kHz and the audio signal set at 1 kHz. If no sound were desired for the ultrasonic beam, then it would be unmodulated. If on the other hand, a 1 kHz audio signal were to be generated then the 50 kHz signal would be amplitude modulated with a 1 kHz signal. Other forms of carrier modulation are anticipated including amplitude, frequency and quadrature modulation.

One input to the ultrasonic generator includes the velocity 152 of the vehicle. If the vehicle is traveling at a sustained speed, then transducers facilitating drag reduction are engaged. If the vehicle is decelerating then transducers facilitating drag enhancement are engaged. The ultrasonic signal may be either modulated or unmodulated depending on various other inputs to the ultrasonic generator. Furthermore, the carrier or modulation frequency may be adjusted with respect to the velocity. For example, in the embodiment of FIG. 3, the modulation (or carrier) frequency may be adjusted in response to the T-S frequency corresponding to the vehicle speed. Alternatively, all transducers of the invention may be modulated with a frequency in response to the T-S frequency corresponding to the vehicle speed.

A second input to the ultrasonic generator is the brake 154. When the user applies the brake, the drag of the vehicle is increased by activating and deactivating the appropriate transducers. For example, transducer 120 is enabled and transducers 110 and 112 are disabled. If a rearward alert is to be generated, then transducer 112 could remain activated for the duration of the alert. The alert could be a short warning tone, substantially one or more seconds in duration, directed to the rear of the vehicle. Alternatively, the alert could be any audio signal, such as the word "warning" or "brakes" or combinations thereof. Since the alert is modulated upon an ultrasonic carrier, it will substantially only be heard by listeners directly behind the vehicle. Upon completion of the alert, transducer 112 is deactivated to facilitate the slowing of the vehicle by transducer 120.

A third input is the horn 156. Upon sounding the horn, both forward transducers 110 and 120 are activated and the corresponding audio signal modulated there upon. Turning both transducers on increases the audio energy received by vehicle 125. The audio signal is preferably the sound of a conventional car horn and will substantially only be heard by listeners directly in front of the vehicle. Alternately, the audio signal can be any desired audio signal. Furthermore, if only a transducer for drag reduction or enhancement is enabled, then the audio signal may be modulated only upon that transducer without activating the other transducer. Thereby providing the audio signal to the vehicle ahead while maintaining the desired drag reduction or enhancement.

It should be appreciated that other inputs and other audio signals may be used while remaining within the scope of the invention. For example, the audio component could be coupled to a microphone and a representation of the voice of a vehicle occupant communicated to a vehicle ahead. The vehicle ahead could have a similar system and use the rearward transducer coupled to a microphone, thereby facilitating substantially private conversations between occupants of the traveling vehicles. This communication may be done while facilitating drag modulation with the ultrasonic energy carrier signals.

Figure 5:
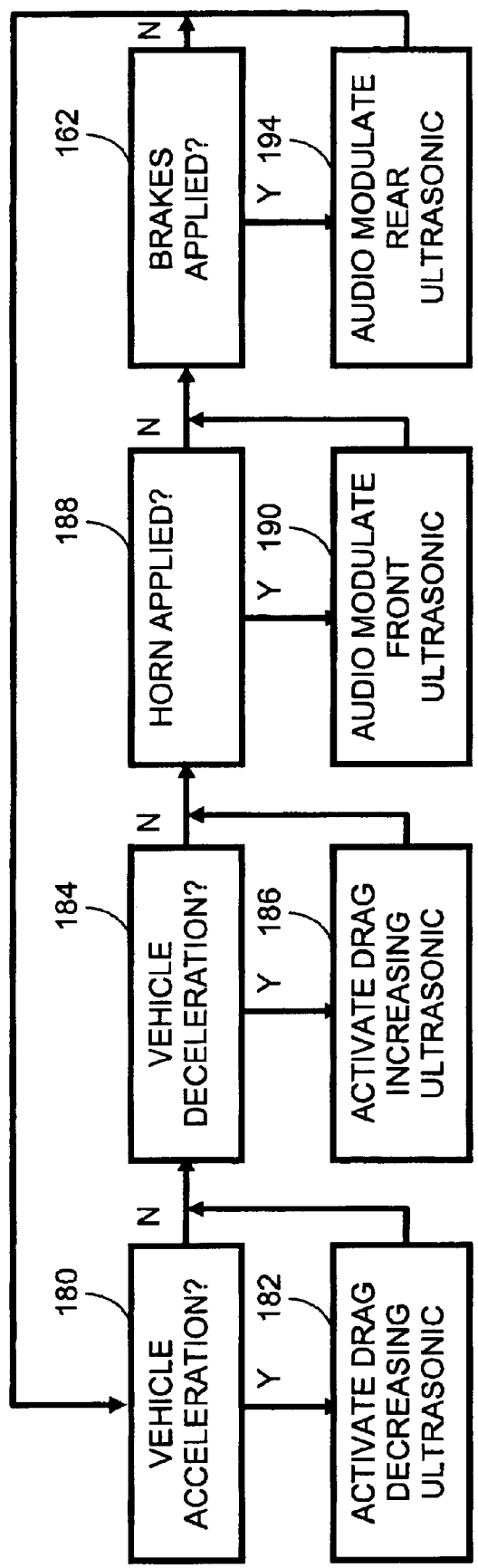
FIG. 5 shows a flow diagram of the operation of the ultrasonic generator and audio modulator of FIG. 4 in accordance with the present invention.

FIG. 5 shows a flow diagram of the operation of the ultrasonic generator and audio modulator of FIG. 4. Step 180 determines if the vehicle is to accelerate or if it is cruising at a sustained velocity, if cruising then ultrasonic transducers that actively reduce the drag are enabled at step 182. Step 184 determines if the vehicle is to decelerate, if so then ultrasonic transducers that actively increase and thereby enhance the drag are enabled at step 186. Step 188 determines if the vehicle horn is applied, if so then a manual signal from an occupant of the vehicle is received (such as the operator activating the horn switch) and the front ultrasonic transducers are enabled with ultrasonic signals carrying audio modulation at step 190. Step 194 determines if the vehicle brakes are applied, if so then a manual braking signal from the operator of the vehicle is received (such as the operator applying the brake pedal) and the rear ultrasonic transducers are enabled with ultrasonic signals carrying audio modulation at step 194.

As a further example, vehicle drag modulation may be used in automotive racing applications where the amount of weight or downward force applied to various tires of a race vehicle may be varied depending upon various applications to the vehicle. Drag modulation may be independently performed for an area above each tire by placing transducers accordingly. For example, the drag on the front wheels may be increased while the vehicle is going into a turn to facilitate front tire traction during the beginning of the turn. Alternately, drag on the rear wheels may be increased coming out of a turn to facilitate improved acceleration traction coming out of the turn. On a straight section of track drag may be decreased to improve speed or modulated to provide sufficient tire force on the ground to maintain control of the vehicle. The transducers may be located in the appropriate areas as shown in FIG. 2, or remotely located as shown in FIG. 3. These features may be advantageously accomplished without complicated moving parts such as fins or control surfaces and may be done under computer control, without significant driver intervention.

Figure 6:
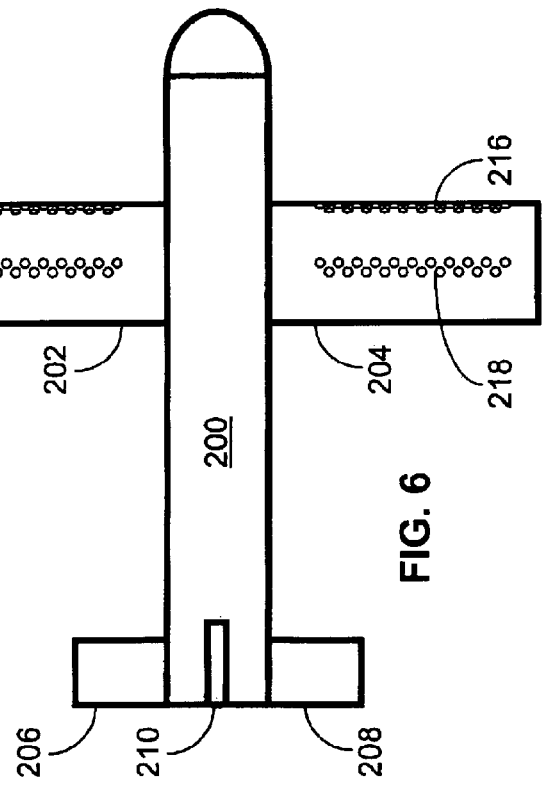
FIG. 6 shows a top view of an aircraft with active drag modulation in accordance with the present invention.

FIG. 6 shows a top view of an aircraft with active drag modulation in accordance with the present invention. The aircraft has left and right forward wings 202 and 204, left and right rear wings 206 and 208 and a tail 210. Each wing has a first ultrasonic transducer for transmitting an energy beam that increases drag and a second ultrasonic transducer for transmitting an energy beam that decreasing drag. Wing 202 has ultrasonic transducer 212 facing forward for disrupting laminar flow thereby increasing or enhancing drag and ultrasonic transducer 214 located in the transition zone between turbulent and laminar flow regions for reducing drag. Similarly, wing 204 has ultrasonic transducer 216 facing forward for disrupting laminar flow thereby increasing or enhancing drag and ultrasonic transducer 218 located in the transition zone between turbulent and laminar flow regions for reducing drag.

The drag on the forward wing can be increased by transmitting ultrasonic energy beams from forward transducers 212 and 216, while the drag on the forward wing can be decreased by transmitting ultrasonic energy beams from transducers 214 and 218. Rear wings 206 and 208 may have similar transducers situated there upon for producing similar drag modulation thereupon.

Figure 7:
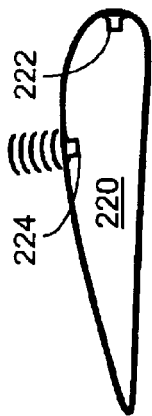
FIG. 7 shows a cross sectional view of a wing with a drag reduction transducer activated in accordance with present invention.

FIG. 7 shows a cross sectional view of a wing with a drag reduction transducer activated. Wing 220 has forward transducer 222 deactivated and transducer 224 activated. Transducer 224 is located in the transition region between turbulent and laminar flows.

Figure 8:
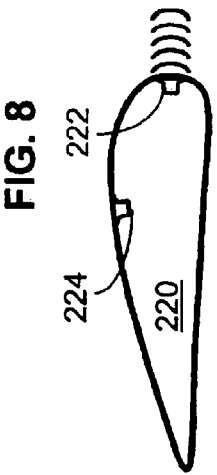
FIG. 8 shows a cross sectional view of a wing with a drag enhancement transducer activated in accordance with the present invention.

FIG. 8 shows a cross sectional view of a wing with a drag enhancement transducer activated. Wing 220 has forward transducer 222 activated and transducer 224 deactivated. Transducer 224 is located on the leading edge of the laminar flow.

Figure 9:
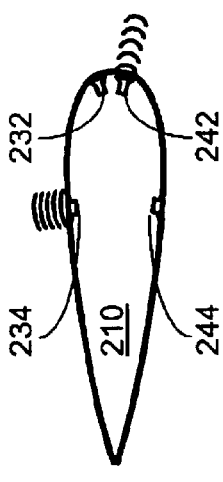
FIG. 9 shows a cross section of a tail with drag reduction on the left side and drag enhancement on the right side in accordance with the present invention.

FIG. 9 shows a cross section of a tail with drag reduction on the left side and drag enhancement on the right side. Tail 210 has left forward transducer 232 deactivated and transducer 234 activated. Transducer 234 is located in the transition region between turbulent and laminar flows of the left side of the tail. Furthermore, tail 210 has right forward transducer 242 activated and transducer 244 deactivated. Transducer 244 is located on the leading edge of the laminar flow of the right side of the tail. Thus, the tail of FIG. 9 has drag reduction on the left side and drag enhancement on the right side.

Figure 10:
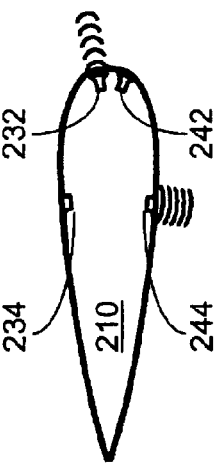
FIG. 10 shows a cross section of a tail with drag reduction on the right side and drag enhancement on the left side in accordance with the present invention.

FIG. 10 shows a cross section of a tail with drag reduction on the right side and drag enhancement on the left side. Tail 210 has right forward transducer 242 deactivated and transducer 244 activated. Transducer 244 is located in the transition region between turbulent and laminar flows of the right side of the tail. Furthermore, tail 210 has left forward transducer 232 activated and transducer 234 deactivated. Transducer 234 is located on the leading edge of the laminar flow of the left side of the tail. Thus, the tail of FIG. 10 has drag reduction on the right side and drag enhancement on the left side.

The transducers of FIG. 6–FIG. 10 may be independently activated by a control system similar to the control system of FIG. 4 but adapted for aircraft applications. For example, activation of transducers 214 and 216 will reduce drag on the left wing while increasing drag on the right wing. Similarly activation of transducers 212 and 218 will increase the drag on the left wing while decreasing the drag on the right wing. Similar controls may be performed on the rear wings. The ability to actively change the drag on each wing facilitates control of the aircraft. Similarly, the ability to actively change the drag on the left or right side of the tail further facilitates flight control of the aircraft. Thus, this system of active drag modulation has the advantage of facilitating flight control without moving control surfaces.

The magnitude of drag modulation can be controlled by modifying the frequency or energy of the energy beam transmitted by the transducers. Furthermore, the transducers are preferably an array of transducers. For example, transducers 212–218 are each comprised of a multiplicity of transducers. The magnitude of the drag modulation may be increased or decreased by enabling more or less of the multiplicity of transducers in each array. Rear wing and tail transducers 232–244 may be comprised of similar arrays of multiple transducers. While the invention is described in the context of ultrasonic acoustic energy, other forms of acoustic energy are also anticipated, such as audio energy modulated at frequencies resulting in the described drag modulations. Furthermore, alternate types of energy beams are anticipated, such as electromagnetic energy beams such as microwave, infrared and visible lasers.

It should be further appreciated by those familiar with the art that similar principles may be applied to boats or other water craft. The active drag modulation may similarly performed in water and affect the drag experienced by the hull of a ship.

In other embodiments, pulsed ultrasound can create a waveform in front of a moving object such as a car, airplane, boat or train by pulsing an ultrasonic wave in front of the moving object to create a waveform. The moving object would follow into this waveform. The waveform could further create a cavity or lower drag environment for object to travel within.

Currently, a vehicle cuts the water or air in front of it. This causes a friction. The friction or drag may be caused by any type of environmental media including air and water. A waveform could create a pulsed envelope providing something that does not have returning reactive force. This could create vacuum or vacuum like condition within which the vehicle would travel, resulting in decreased frictional resistance and improved efficiency such as fuel efficiency and/or glide range.

This can be used to assist the wing and lift on an airplane, or a boat in terms of making it easier to plane. Furthermore, this can be used to facilitate travel of a bullet or other projectile or moving object within the ultrasonic beam. The beam could be a continuous wave ultrasound or could be a pulsed ultrasonic wave creating a wave. The beam could be linked to the speed of the moving object so that the greater the speed, the faster the impulses or the more energy created impulses or further heavy impulses would form.

Alternate forms of energy beams could also be used such as a laser to heat the air or to break the air or water, electric pulse signals, microwave, other known acoustic, electric, optical, or other electromagnetic energy which would create heat or a pulsed wave pattern where the wing or the wedge of the moving object would head into.

This could be a constant or pulsed energy beam and adjusted for the speed and/or vertical lift. It would have applications for all types of vehicles or moving objects.

The energy beam can also be placed in the rear of the vehicle to improve the efficiency by decreasing the turbulence behind the vehicle to improve efficiency. The basic concept of a slip stream is that a vehicle traveling in a slip stream created by a turbulent area behind a leading vehicle allows the vehicle traveling in the slip stream to travel more efficiently. This utilizes the principles of another object in front of a vehicle cutting the water/air to create negative pressure resulting a mass or air traveling at substantially the same speed of the second vehicle located ahead of the second vehicle. This slip steam could again be created with this pulsed or continuous wave pattern which could be pulsed ahead of the vehicle by the energy beams. This generally could be used for a number of applications including weapons such as projectiles, missiles or space based objects.

These energy beam projectors such as ultrasound can be very inexpensive. There can be multiple projectors placed across the front of the vehicle or along the sides of the vehicle, or in front of the airplane or along the wings. It could also be placed in the front and the back, it could be different wavelengths depending on the location relative to the vehicle and project different wave lengths depending on the speed and energy again related to the speed density of the air and whether there is a cross current or crossing fiber. The location of this could be adjusted if, for example, there is wind at a 45° angle to the front. The angle of these ultrasonic beam generators could change to go more directly into the direction of the wind being broken into or the waves which are beating against the boat, for vehicle resulting in increased friction or drag.

Thus, there are many different features to the invention. It is contemplated that these features may be used either alone or in combination. It should be understood by those familiar with the art that numerous modifications and equivalent features may be substituted without departing from the spirit and scope of the invention. The scope of my invention is not to be restricted, therefore, to the specific embodiments described, and that equivalent applications, modifications, and embodiments within the scope of the invention are contemplated.

What is claimed is:

1. A method for controlling a drag of a vehicle traveling through an environmental media, comprising:

creating a first acoustic signal;
directing the first acoustic signal into a transitional section between a laminar flow and a turbulent flow of a boundary layer adjacent to a surface of the vehicle;
creating a second acoustic signal; and
directing the second acoustic signal into the laminar flow of the boundary layer adjacent to the surface of the vehicle,
wherein the drag is controlled independent of movement of the surface of the vehicle.

2. The method according to claim 1 wherein the environmental media substantially comprises air, water, or a combination thereof.

3. The method according to claim 1 further comprising adjusting a frequency of at least one of the first and second acoustic signals in response to a signal from an operator of the vehicle.

4. The method according to claim 3 wherein the first acoustic signal is transmitted from a first location of the vehicle and the second acoustic signal is transmitted from a second location of the vehicle.

5. The method according to claim 4 wherein the vehicle drag is decreased in response to transmitting the first acoustic signal and the vehicle drag is increased in response to transmitting the second acoustic signal.

6. The method according to claim 4 wherein the vehicle drag at the first location of the vehicle is decreased in response to transmitting the first acoustic signal and the vehicle drag at the second location of the vehicle is decreased in response to transmitting the second acoustic signal.

7. The method according to claim 6 wherein the vehicle is an airplane and the first location of the vehicle corresponds to a first wing and the second location of the vehicle corresponds to a second wing, thereby providing for flight control of the airplane.

8. The method according to claim 3 wherein the frequency is modulated in response to the vehicle speed.

9. The method of claim 1, wherein the first acoustic signal has a frequency greater then a critical frequency of a T-S wave in the boundary layer.

10. The method of claim 1, wherein the second acoustic signal has a frequency less then a critical frequency of a T-S wave in the boundary layer.

11. The method of claim 1, wherein the first and second acoustic signals are ultrasonic signals.

12. The method according to claim 11 further comprises the step of selectively modulating the ultrasonic signals with an audio signal in response to a manual input from an operator of the vehicle.

13. In a vehicle traveling through an environmental media and experiencing drag as a result of the environmental media, a device comprising:
a first acoustic signal transmitter for transmitting a first acoustic signal into a transitional section between a laminar flow and a turbulent flow of a boundary layer adjacent to a surface of the vehicle, decreasing the drag on the surface of the vehicle;
a second acoustic signal transmitter for transmitting a second acoustic signal into the laminar flow of the boundary layer adjacent to the surface of the vehicle, increasing the drag on the surface of the vehicle, increasing the drag on the surface of the vehicle; and
an active drag controller for selectively enabling said first and second acoustic signals, wherein the device modulates drag independent of movement of the surface of the vehicle.

14. The device according to claim 13 wherein the vehicle is an aircraft and the first acoustic signal is transmitted from a first wing and the second acoustic signal is transmitted from a second wing and
said active drag controller enables both first and second acoustic signals thereby decreasing the drag of the first wing and increasing the drag of the second wing and facilitating aerodynamic control of the aircraft.

15. The device according to claim 13 wherein the first and second acoustic signals are ultrasonic signals.

16. The device according to claim 13 wherein
said active drag controller varies a frequency of the first and second acoustic signals in response to a velocity of the vehicle traveling through the environmental media.

17. The device according to claim 13 wherein
the vehicle operates on the ground;
the environmental media is air;
the first and second acoustic signals are ultrasonic signals and the vehicle further comprises
a manual input receiver for receiver a manual input from an occupant of the vehicle; and
an audio modulator for selective modulating an audio signal upon at least one of the first and second acoustic signals in response to the manual input from the occupant of vehicle.

18. A directional control system for a vehicle traveling through an environmental media comprising a plurality of signal generators affixed proximal to the surface of the vehicle, the plurality of signal generators including a first group of signal generators directing a first acoustic signal into a transitional section between a laminar flow and a turbulent flow of a boundary layer adjacent to the surface of the vehicle and a second group of signal generators directing a second acoustic signal into the laminar flow of the boundary layer adjacent to the surface of the vehicle, the plurality of signal generators modulating drag independent of movement of the surface of the vehicle.

19. The directional control system of claim 18, further comprising an active drag controller for selectively enabling said first and second signal generators.

20. The directional control system of claim 18, wherein the vehicle is an airplane having first and second wings.

21. The directional control system of claim 20, wherein the first group of signal generators is connected proximal to an upper surface of each of the first and second wings.

22. The directional control system of claim 21, wherein the second group of signal generators is connected proximal to a leading edge surface of each of the first and second wings.

23. The directional control system of claim 18, wherein the first group of signal generators decreases a drag over the surface of the vehicle.

24. The directional control system of claim 18, wherein the second group of signal generators increases a drag over the surface of the vehicle.

25. The directional control system of claim 18, wherein the plurality of signals generators each generate an ultrasonic signal.

26. The directional control system of claim 18, further comprising an audio modulator for selective modulating an audio signal upon at least one of the first and second acoustic signals in response to the manual input from the occupant of the vehicle.

* * * * *